May 9, 1961 K. E. THOMPSON, JR 2,983,624
GLASS FABRIC GASKET AND DIAPHRAGM MATERIAL COATED WITH
A CURED ELASTOMERIC COPOLYMER OF VINYLIDENE FLUORIDE
AND HEXAFLUOROPROPENE AND METHOD OF MAKING SAME
Filed July 16, 1956
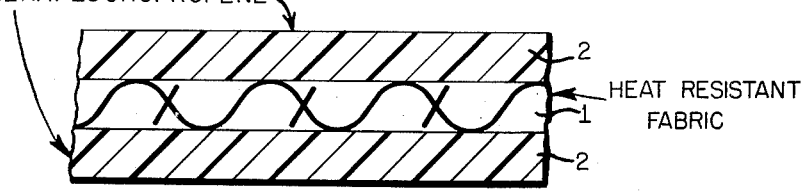
*INVENTOR*
KENNETH E. THOMPSON, JR.
BY
*AGENT*

2,983,624

GLASS FABRIC GASKET AND DIAPHRAGM MATERIAL COATED WITH A CURED ELASTOMERIC COPOLYMER OF VINYLIDENE FLUORIDE AND HEXAFLUOROPROPENE AND METHOD OF MAKING SAME

Kenneth E. Thompson, Jr., Cornwall-on-Hudson, N.Y., assignor to E. I. du Pont de Nemours and Company, Wilmington, Del., a corporation of Delaware Filed July 16, 1956, Ser. No. 597,894

2 Claims. (Cl. 117—68)

This invention relates to flexible coated fabrics which are resistant to high temperatures and corrosive chemicals.

Certain new types of power plants now being developed involve the metering and/or storing either hot and/or corrosive fuels. There is an urgent need for a flexible membrane which will withstand temperatures exceeding 400° F. and be unaffected by hot jet fuels, fuming nitric acid, and highly active oxidizing agents such as, e.g., hydrazine and hydrogen peroxide.

Polymers are available for coating fabrics which are resistant to temperatures above 400° F., however they fail in either flexibility or resistance to corrosive chemicals for use in connection with the metering and storing of fuels for the newer power plants.

An object of this invention is to provide a flexible coated fabric which is unaffected by temperatures above 400° F. and resistant to highly corrosive chemicals at elevated temperatures. Other important objects will be readily apparent from the following description of the invention.

The objects of this invention are accomplished by impregnating and/or coating a heat and chemical resistant fabric such as, e.g., those made from filaments of polytetrafluoroethylene, glass or asbestos with a composition comprising a copolymer of about 30%–70% vinylidene fluoride units and about 70%–30% of hexafluoropropene units and a curing agent, heating the treated fabric to cure the copolymer. The chemical and heat resistant fabrics must not be appreciably degraded when exposed to a temperature of 400° F. for 16 hours.

The single figure of the drawing is a cross-sectional illustration of the product of this invention in which 1 refers to a heat resistant fabric and 2 refers to a coating of a cured elastomeric copolymer of vinylidene fluoride and hexafluoropropene.

The following specific examples are given by way of illustrating the best mode contemplated for carrying out the invention.

Example I

A high temperature and chemical resistant gasket material was made in accordance with the following procedure:

A woven glass fabric having the following specification:

| | |
|---|---|
| Width | 38 inches. |
| Thickness | .004 inch. |
| Weight | 3.16 oz. per sq. yd. |
| Weave | Plain (one over one). |
| Thread count per inch | 60 warp and 58 filler. |
| Yarn size (warp and filler) | 450 2/2. | was base coated with a 40% solution of the following mill mixed dry compound in methyl ethyl ketone:

| | Parts by weight |
|---|---|
| Elastomeric reaction product of 50 parts (by weight) of vinylidene fluoride and 50 parts (by weight) of hexafluoropropene | 100.0 |
| Zinc oxide | 10.0 |
| Dibasic lead phosphite | 10.0 |
| Hydrated silica | 20.0 |
| Benzoyl peroxide | 3.0 |
| | 143.0 |

Sufficient of the 40% solution was applied to each side of the glass fabric to deposit a dry coating of 1–2 ounces per square yard on each side, with forced drying between each coat.

The base coated glass fabric was calender coated on each side with the dry mill mixed compound referred to above which also contained .5% of stearic acid based on the weight of the elastomer.

The calendering operation is carried out at a temperature of 150° F.–225° F. If a lower temperature is used the compound is too hard and requires too high pressures which will crush and break the glass filaments in the glass fabric. If a higher temperature is used the compound becomes too sticky and does not have sufficient mechanical strength to be pulled from the calender roll in the form of a continuous film. A film about 6.0 mils thick was first calendered onto one side of the base coated fabric and then talced to reduce surface tack. The other side was then calender coated with a film about 6 mils thick.

The calender coated glass fabric was drum cured at 400° F. for 16 hours. The cured coating was firmly anchored to the base coated fabric. The cured coating on the glass fabric was insoluble in methyl ethyl ketone after a 24-hour immersion test. The coating was unaffected by fuming nitric acid, concentrated sulfuric acid, and a 24-hour immersion in 10% sodium hydroxide aqueous solution.

Example II

A fuel bladder for fuming nitric acid was prepared in accordance with the following procedure.

The following ingredients were thoroughly mixed on a two roll rubber mill:

| | Parts by weight |
|---|---|
| The elastomeric reaction product of 50 parts (by weight) of vinylidene fluoride and 50 parts (by weight) of hexafluoropropene | 100.0 |
| Zinc oxide | 10.0 |
| Dibasic lead phosphite | 10.0 |
| Hydrated silica | 20.0 |
| Benzoyl peroxide | 3.0 |
| | 143.0 |

The milled compound was dissolved in methyl ethyl ketone to make a 50% solution. The solution was cast on a glass surface to form a dry film approximately 7 mils thick after evaporation of the solvent. The film was stripped from the glass. A sandwich was prepared consisting of two such films and a middle layer of a woven fabric of 1,000 denier polytetrafluoroethylene fibers having a thread count of 28 threads per inch in both the direction of the warp and filler, weighing 9.7 ounces per square yard.

The sandwich was subjected to a pressure of about 300–400 p.s.i. at a temperature of 300° F. for a period of about 5 minutes. The preformed films flowed and permeated the woven polytetrafluoroethylene fabric and the assembly became welded into a unitary structure, in which the fabric was embedded in the compounded elastomer. The laminated assembly was subjected to 350° F. for 16 hours to cure the elastomeric compound.

The laminated product was immersed in fuming nitric acid for 10 days at room temperature. The laminated assembly retained its original flexibility, and there was no degradation of the compound elastomer during the immersion test.

*Example III*

A gasket and diaphragm material for use where resistance to high temperature, oils and chemicals is required was made as follows:

The same polytetrafluoroethylene fabric referred to in Example II was base coated on each side with a 40% solution of the compounded elastomer described in Example II in methyl ethyl ketone. Sufficient of the base coat was applied to each side of the fabric to deposit about 1–2 ounces of dry coating per square yard, with forced drying between each coat. The base coated fabric was calender coated on each side with the same dry calender compound described in Example II containing .5% of stearic acid based on the weight of the elastomer. The temperature of the compound during the calendar operation was about 150°–225° F. If the temperature of the calender compound is below about 150° F. during the calendering operation it is too hard and is not calenderable. If the temperature is above about 225° F. the calender compound becomes too sticky and lacks sufficient mechanical strength to be pulled away from the calender roll in the form of a film.

A film about 8 mils thick was calendered onto one side of the base coated polytetrafluoroethylene fabric and then a similar film is calendered onto the other side. The surface of the first calender coated side was talced before the second side was calender coated to reduce the surface tack and prevent sticking to the bottom calender roll during the calendering of the second side. The polytetrafluoroethylene fabric readily distorts under excessive pressure and close control of the pressure is essential during the calender operation. The polytetrafluoroethylene fabric calender coated on both sides was drum cured at 400° F. for 16 hours. The cured coating was resistant to attack by fuming nitric acid, concentrated sulfuric acid, 10% aqueous solution of sodium hydroxide, aliphatic hydrocarbons, benzene, lubricating oils, and diester oils by a 24 hr. immersion test.

*Example IV*

A woven asbestos fabric 40 mils thick supplied by Raybestos Manhattan Corporation, 92 Townsend Street, Passaic 2, New Jersey, identified as AAAA grade was calender coated on each side with same dry calender compound containing .5% stearic acid based on the elastomer as employed in Example I. The calendering operation was carried out by having all the calender rolls at about 150° F. An eleven mil film was calendered directly onto each side of the asbestos fabric. No solution base coat was applied to the asbestos fabric before the calender coat. After calendering coating the first side the coating was talced to reduce surface tack before calendering the second side. The coated fabric was drum cured at a temperature of 400° F. for 16 hours to cure the coating.

The asbestos fabric calender coated on each side was 62 mils thick. The coating was thermally stable for an extended period of 1 month at 450° F. and for one week at 500°–525° F. The cured coating was insoluble in ketones and hydrocarbons, both aromatic and aliphatic.

It is important that the coating compositions of this invention be cured to the insoluble stage. This is accomplished by subjecting the coating to a temperature of at least 350° F. for a length of time sufficient to cure the coating.

In place of woven fabrics formed of glass, asbestos and polytetrafluoroethylene non-woven fabrics or felts of these fibers may be used to produce the chemical heat resistant coated fabrics of this invention. It is possible to make useful products by coating only one side of the fabric substrate. The entire amount of coating can be applied by solution coating technique.

The copolymers useful in carrying out this invention are prepared by copolymerizing from 60 to 15 parts by weight of vinylidene fluoride with from 40 to 85 parts by weight of hexafluoropropene at temperatures of from 85° to 100° C. under autogenous pressure preferably in the presence of a polymeriztion initiator. The resulting elastomeric composition is a copolymer containing from about 70% to 30% by weight of vinylidene fluoride units and from about 30% to 70% hexafluoropropene units.

While there are above disclosed but a limited number of embodiments of the structure, process and product of the invention herein presented, it is possible to produce still other embodiments without departing from the inventive concept herein disclosed, and it is desired therefore that only such limitations be imposed on the appended claims as are stated therein, or required by the prior art.

The embodiments of the invention in which an exclusive property or privilege is claimed are defined as follows:

1. A gasket and diaphragm material resistant to attack by fuming nitric acid, concentrated sulfuric acid and 10% aqueous solution of sodium hydroxide comprising a substrate of glass fabric coated on both sides with a cured elastomeric copolymer of 30–70% vinylidene fluoride and 70–30% hexafluoropropene, said percentages being on a weight basis.

2. The process of preparing a gasket and diaphragm material which comprises base coating a glass fabric substrate on each side with a composition comprising an elastomeric copolymer of 30–70% vinylidene fluoride and 70–30% hexafluoropropene and a volatile solvent for said copolymer, removing the volatile solvent from said coating, further coating each side of said base coated fabric with a composition heated to about 150°–225° F., said second mentioned composition being free of volatile solvent and comprising said copolymer and curing agent for said copolymer, heating said coated fabric at about 400° F. to cure said copolymer to the insoluble stage.

References Cited in the file of this patent

UNITED STATES PATENTS

| | | |
|---|---|---|
| 2,186,917 | Gaylor | Jan. 9, 1940 |
| 2,549,935 | Sauer | Apr. 24, 1951 |
| 2,768,925 | Fay | Oct. 30, 1956 |
| 2,770,606 | Teeters et al. | Nov. 13, 1956 |
| 2,782,174 | Metherington et al. | Feb. 19, 1957 |

FOREIGN PATENTS

| | | |
|---|---|---|
| 467,677 | Canada | Aug. 29, 1950 |

OTHER REFERENCES

The Rubber Age, vol. 76, January 1955, pp. 543–550.